Oct. 17, 1933.   G. E. A. HALLETT   1,930,553
HYDRAULIC VALVE GEAR
Filed July 31, 1926   4 Sheets-Sheet 1

Inventor
George E. A. Hallett

By Blackmore, Spencer & Flint
Attorneys

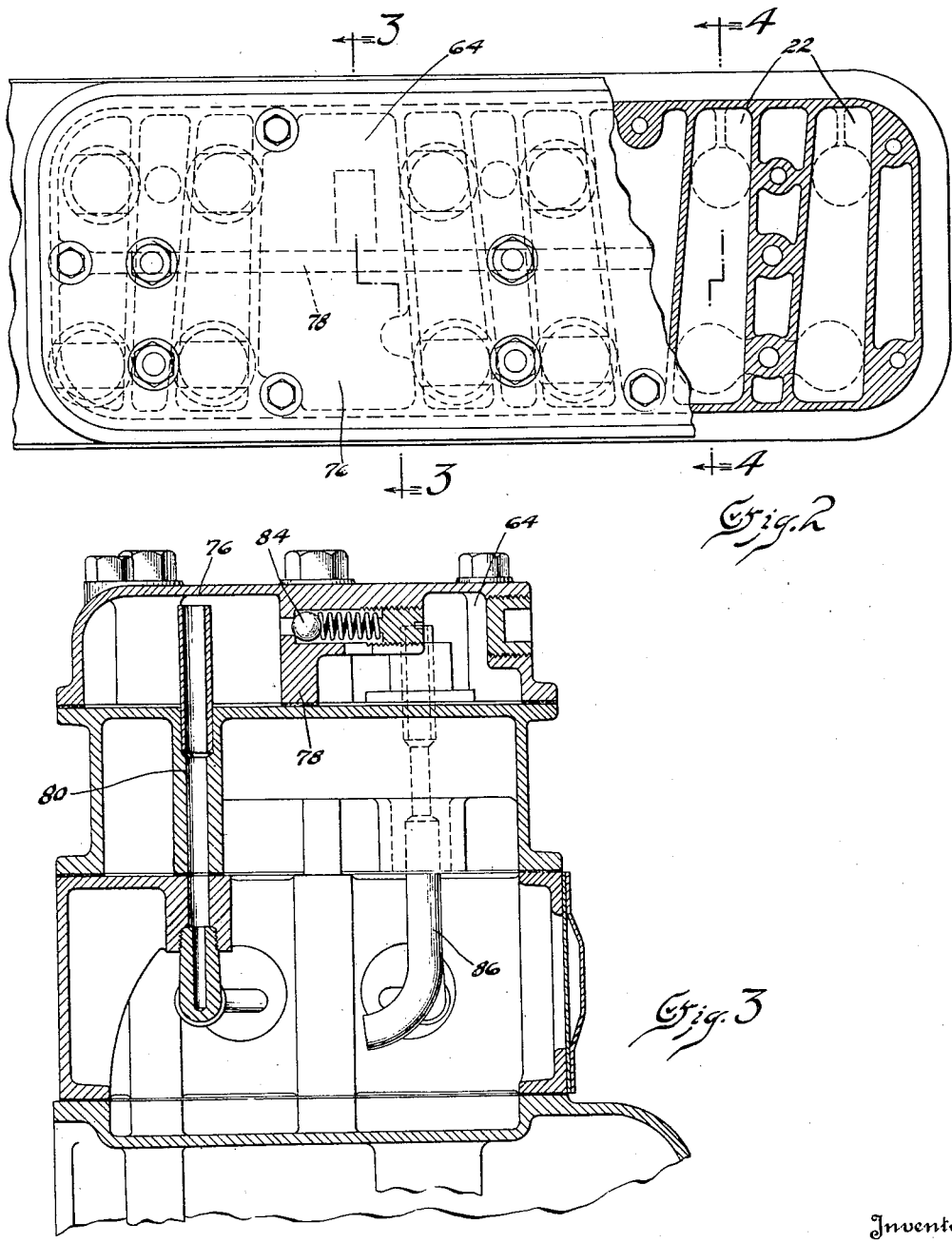

Oct. 17, 1933.    G. E. A. HALLETT    1,930,553
HYDRAULIC VALVE GEAR
Filed July 31, 1926    4 Sheets-Sheet 4
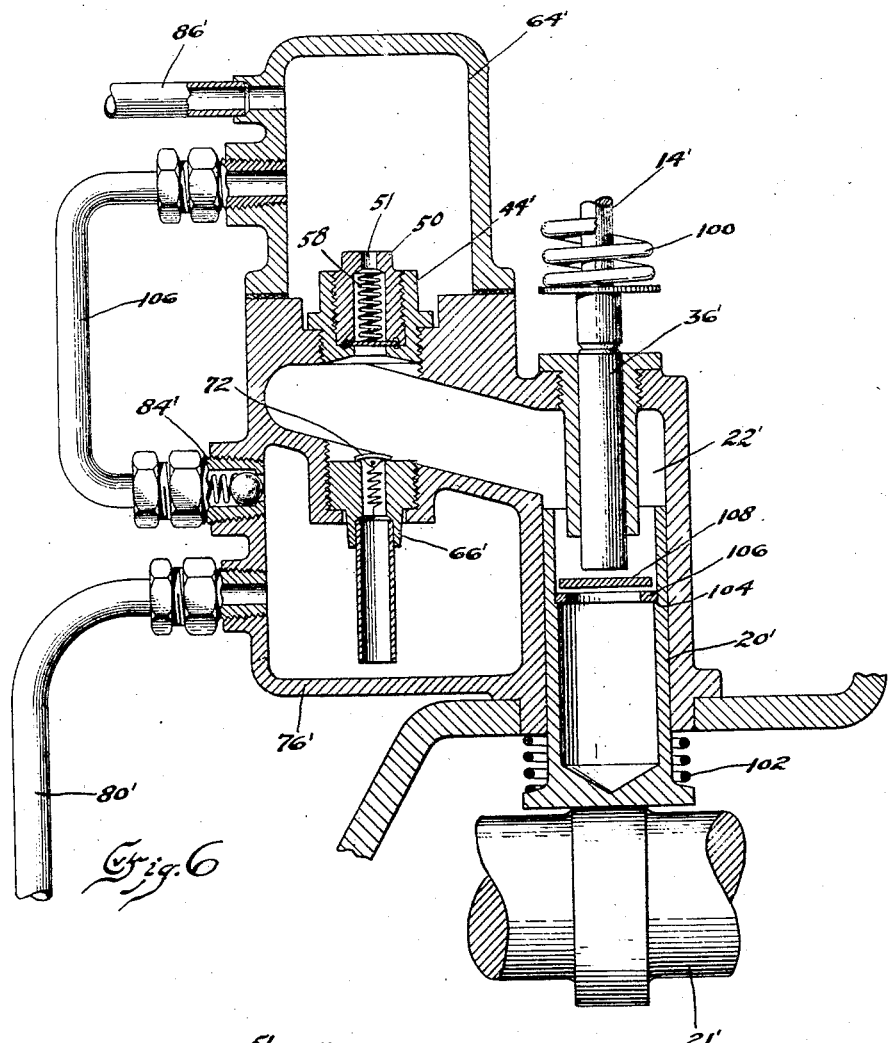
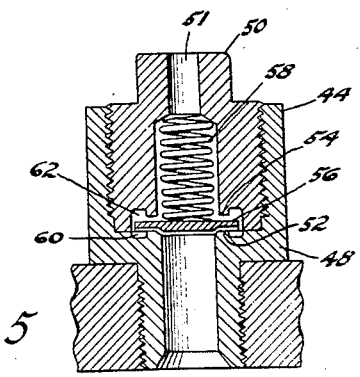

Patented Oct. 17, 1933

1,930,553

UNITED STATES PATENT OFFICE 1,930,553

HYDRAULIC VALVE GEAR

George E. A. Hallett, Detroit, Mich., assignor to General Motors Research Corporation, Detroit, Mich., a corporation of Delaware Application July 31, 1926. Serial No. 126,297

15 Claims. (Cl. 123—90)

This invention relates to hydraulic mechanism of the type in which a body of fluid is interposed between an operating member and an operated member to transmit force from the former to the latter. It relates particularly to mechanism of this type designed for use upon internal combustion engines to replace the conventional mechanical valve mechanism, the operating member in this case being the customary valve tappet and the operated member the valve itself. Hydraulic actuation of valves possesses many advantages over mechanical actuation. Thus with hydraulic actuation there is no back lash for a cushion of oil is at all times interposed between valve and tappet. This gives silent operation. Since both valve and tappet move in rectilinear directions there is no side thrust to produce wear on valve or tappet guides. While mechanically actuated valves require careful and frequent adjustment and the adjustment is disturbed by changes in temperature and wear this is not true of hydraulic actuating gear for the effects of changes of size of valve and tappet upon the body of fluid are negligible. As oil is usually employed as the operating fluid hydraulic gear is self lubricating. Another advantage lies in the fact that the portions of the tappets or tappet operated plungers, projecting into the body of fluid may be made of large diameter so that sufficient movement of the valves is obtainable with shorter strokes of the tappets, this permitting the design of cams of low lift and consequently quieter action.

While hydraulic valve gear possessing some at least of the above advantages have been heretofore designed they have not been completely successful because of the difficulty of maintaining the body of fluid free of air. My invention consists primarily in an hydraulic valve operating mechanism so designed that air is continuously and effectively removed from the operating fluid during the operation of the engine. Thus, according to one form of my invention, I provide a vent, preferably arranged at the highest point in the fluid chamber, which is open for the escape of air only during the non-operating portions of the cycle of movement of the mechanism, the vent being sealed during the operating portions of the cycle by means of a valve forced to its seat by the pressure exerted on the fluid body by the valve operating mechanism. To form this vent I have preferred to provide a second seat for the valve upon which the latter rests on the return stroke of the valve operating mechanism, this seat or valve as desired being grooved or otherwise formed to provide a passage for the escape of air around the valve. In order to prevent the passage of air into the fluid chamber through the vent I have preferably so arranged my mechanism that the vent discharges into a reservoir filled with fluid and is sealed thereby.

To increase the effectiveness of the vent and render the removal of air positive I cause a stream of fluid to flow into and through the chamber during the non-operating portions of the cycle of movement of the valve operating mechanism to scavenge the chamber of any air which may have collected therein. Thus I have provided a second passage leading into the fluid chamber, the passage communicating at its outer end with a source of fluid supply under pressure and being provided with a one-way valve permitting fluid to flow into the chamber. For convenience the source of fluid may be the engine oil supply and the source of pressure may be the usual oil pump which receives oil from the crankcase, and, besides supplying the bearings, forces some of the oil into a reservoir, hereinafter referred to as the pressure reservoir, from which it may flow at proper times through the passage into the fluid chamber. By this arrangement a liquid seal is provided for the passage and at the same time a reservoir of oil is provided to replenish that in the fluid chamber should the supply in the latter fall very low during periods when the engine is not in operation. With this construction, during the non-operating portions of the cycle of movement of the valve operating mechanism, oil under pressure flows from the pressure reservoir into the fluid chamber and outwardly through the vent carrying with it such air as may have collected in the fluid chamber. This stream discharges into the first mentioned reservoir which is preferably maintained at atmospheric pressure and may, if desired, be provided with a conduit for returning oil to the crankcase.

To insure against the building up of pressures in the pressure reservoir of such values as to overcome the valve spring and cause the valve to open independently of the tappet mechanism, I have preferably provided it with a pressure relief valve which, for convenience of construction, may discharge into the reservoir associated with the vent.

While I have above stated in a general way the principal objects and advantages of my invention, it is to be understood that it includes within its scope various novel details. Thus I have preferably provided the valve stem with a shield to prevent the passage of oil from the fluid chamber downwardly to the valve seat. I have also designed a special head construction for use upon overhead valve engines which reduces the number of chambers and passages to a minimum. For a complete description of these and other novel features, reference should be made to the following description and the accompanying drawings, in which:

Figure 2 is a top plan view of the engine shown in Figure 1.

Figure 3 is a section on line 3—3 of Figure 2.

Figure 5 is a detail view of the vent.

Figure 6 is a sectional view showing the application of my invention to an L-head engine.

Figure 1:
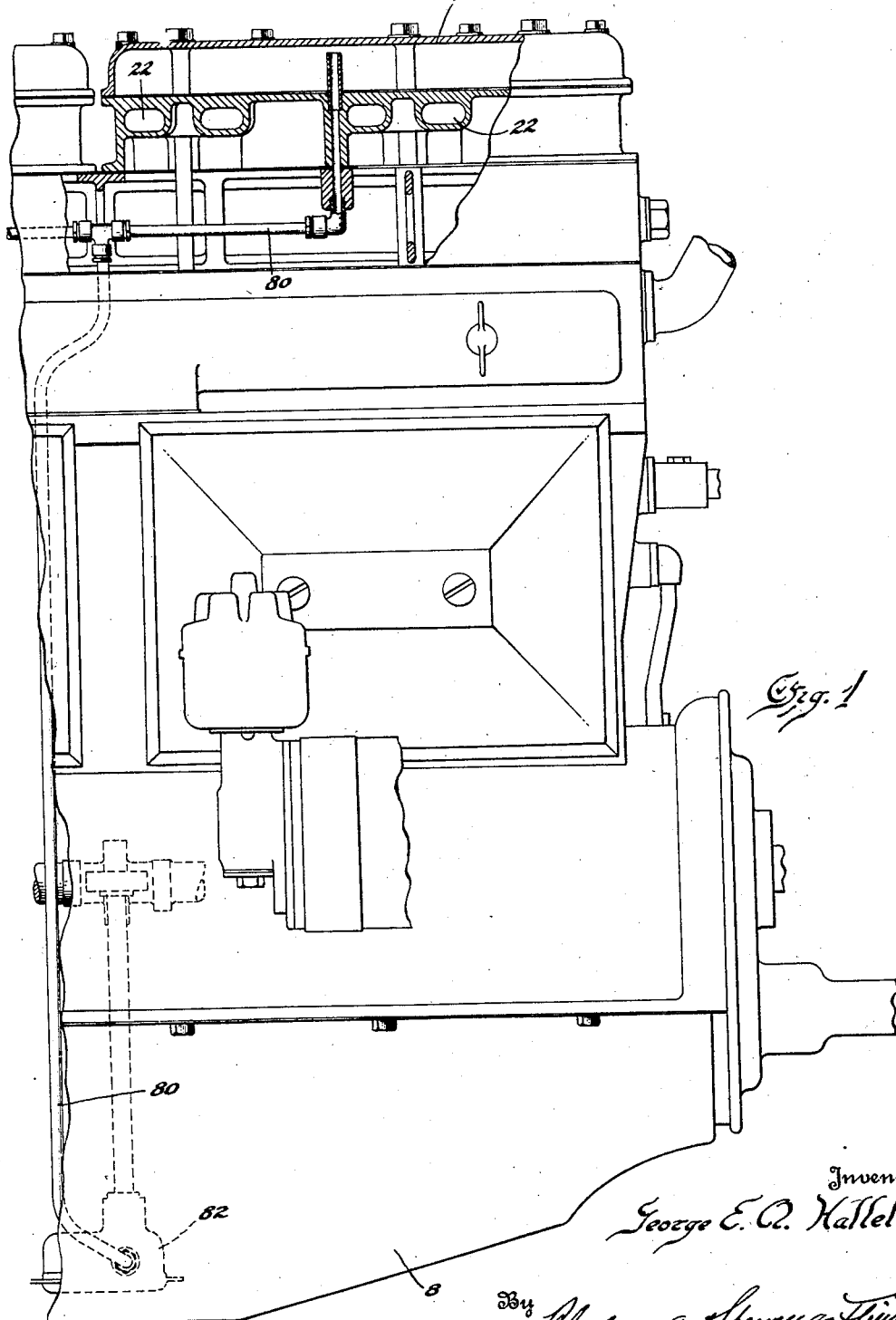
Figure 1 is a side elevation of a portion of an overhead valve type of automobile engine with parts broken away to show the application of my hydraulic valve mechanism thereto.

I have illustrated in Figures 1 to 4 an engine of the overhead valve type provided with the usual crankcase 8 and cylinders 10 within which are mounted pistons 12. The inlet and exhaust valves are mounted in the cylinder head which may be integral or removable as desired. One of these valves is indicated at 14 in Figure 4, this valve controlling the flow of gases through passage 15 which may lead to either the intake or exhaust manifold. This valve is yieldingly held in engagement with its seat by coil spring 16 bearing at one end against a portion of the cylinder head and at the other end against a collar 18 carried by the valve stem.

In overhead valve engines as now manufactured, the valves are opened at the required points in the cycle by means of tappets, one of which is indicated at 20, actuated by cams carried by a conventional cam shaft 21, and effecting movement of the valves through suitable mechanical devices, usually in the form of rocker arms. My invention consists in the substitution of hydraulic operation for the mechanical devices heretofore provided. Thus I have provided a chamber 22 for containing the working fluid and I have provided at the upper end of the valve tappet a plunger indicated at 24 which projects into the chamber 22 and has substantially fluid tight sliding fit in bushing 26. While the plunger 24 may be connected with the tappet I have preferred to use the construction illustrated in which the upper end of the tappet is provided with a rounded plug 28 fitting in socket 30 in the plunger. The lower end of the plunger is provided with a flange 32 against which bears a compression spring 34, the other end of this spring bearing against a fixed surface such as the under side of the casting containing the chamber 22.

In similar manner I have provided at the upper end of the stem of the valve 14 a plunger 36 having substantially fluid tight sliding fit in bushing 38 and having its upper end projecting into chamber 22. I have also indicated at 40 a weak spring bearing at one end against a suitable fixed abutment on the plunger and at the other end against a fixed part of the engine to yieldingly hold the plunger in contact with the valve stem. This abutment, which I have indicated at 42, is preferably in the form of a conical shield so that it will also serve to prevent oil escaping from chamber 22 from passing down the stem of the valve into the combustion chamber.

With the apparatus as so far described, it is apparent that in the operation of the engine cam shaft 21 will force tappet 20 and its associated plunger 24 upwardly thereby displacing fluid in the chamber 22 and forcing plunger 36 downwardly resulting in the opening of valve 14 in opposition to spring 16. The mechanism so far described will operate but in a short while a portion of the oil in the chamber 22 will leak out, even with the best of seals, and be replaced by air and subsequent movement of the tappet will produce no movement of the valve but merely contraction and expansion of the air in the chamber.

As one means of effecting removal of air I have provided a vent indicated at 44 and have arranged this vent at the highest point 46 in the chamber 22. This vent is so designed that during the non-operating portion of the cycle of movement of the valve mechanism a passage is provided for the discharge of air from the chamber 22 and during the operating portion of the cycle of movement of the valve operating mechanism the passage is closed so as to permit proper transmission of force from the tappet to the valve through the body of fluid. I have illustrated my preferred form of vent in detail in Figure 5. This vent consists of a plug 48 having its lower end threaded for engagement with a threaded aperture provided in the upper portion of the chamber 22. The interior of the upper part of the plug 48 is threaded to receive fitting 50 having a central bore 51. The plug 48 is provided with a seat 52 and the fitting 50 is provided with a seat 54 between which is arranged valve 56 yieldingly forced downwardly by spring 58, housed in an enlarged portion of the bore 51 provided in the fitting 50. The valve 56 is designed to form a tight seal when in engagement with the seat 54 and to have a non-sealing fit when in engagement with the seat 52. While this latter object may be accomplished in a number of ways I have illustrated the valve 56 provided with radial slots indicated at 60, these slots affording communication around the valve in conjunction with recess 62 formed in part in the plug 48 and in part in the fitting 50, the valve 56 being of less diameter than the interior diameter of the recess 62.

Figure 4:
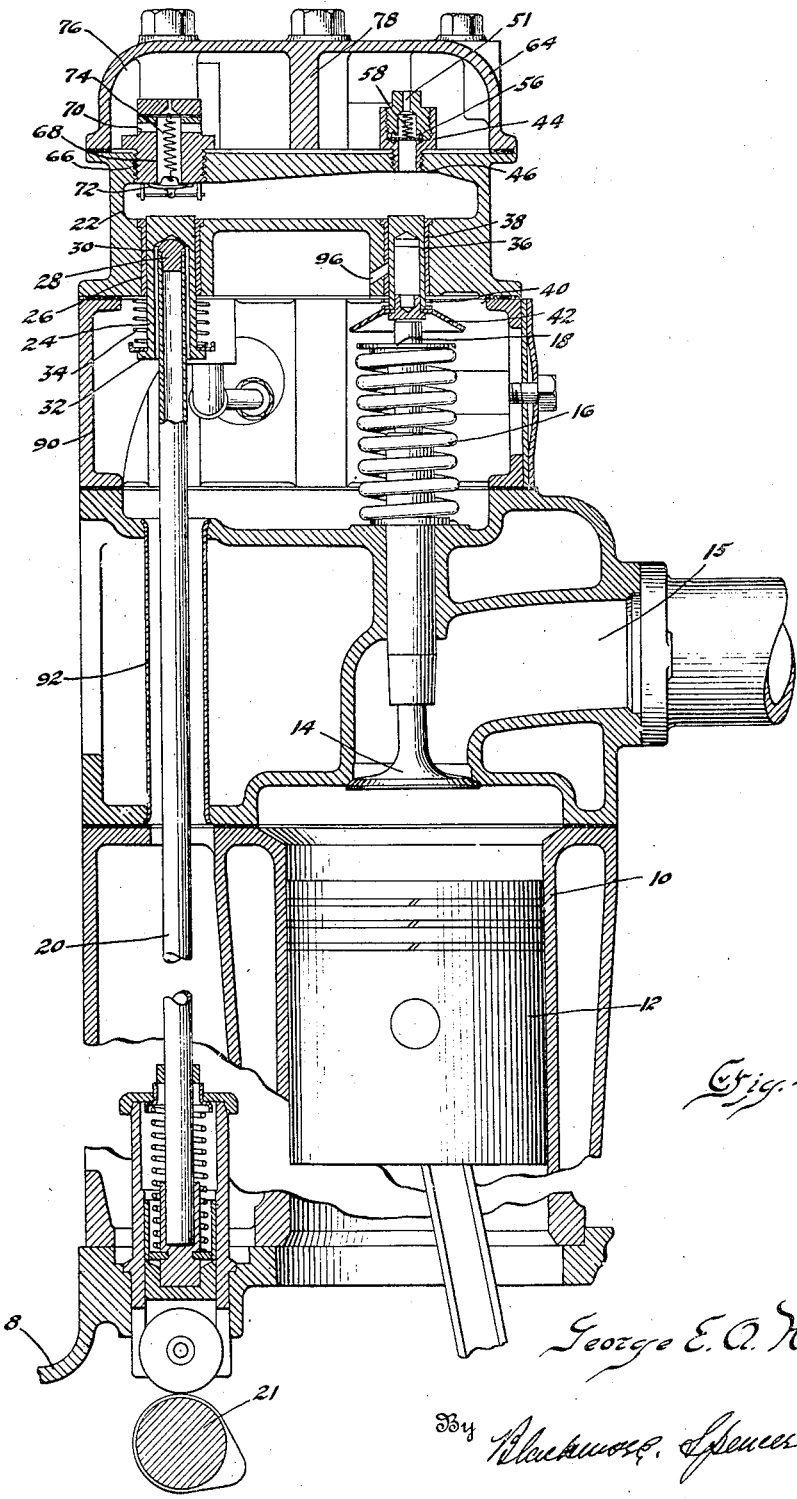
Figure 4 is a section on line 4—4 of Figure 2.

With this fitting in position as shown in Figure 4, it is apparent that upon the operating stroke of the tappet, valve 56 will be forced into engagement with seat 54 and will tightly seal the vent against the passage of fluid from the chamber 22. However, during the non-operating portion of the cycle of movement of the valve mechanism, that is, when the valve is on its seat, the spring 58 will force valve 56 against seat 52 and with the parts in this position air which may have collected in the upper portion of the chamber 22 is permitted to escape through passages 60 and 62 about the periphery of the valve and outwardly through the bore 51 in the fitting 50. This affords a satisfactory vent for the discharge of air but it is obvious that it will not be effective unless means is provided to introduce fluid into the chamber 22 to displace the air and to insure that the proper volume of fluid is in the chamber. One simple method of replenishing the fluid supply may consist in providing a body of fluid, under pressure if desired, in chamber 64 into which the vent projects and within which it is submerged. With this construction during the non-operating portions of the cycle of movement of the valve operating mechanism fluid will pass from chamber 64 through the vent into the chamber 22 simultaneously with the passage of air outwardly through the same vent. While such a construction will prove fairly satisfactory in practice and comes within the scope of my invention, I prefer to employ the construction illustrated in Figure 4 in which, in addition to the vent and chamber 64, but with the latter at atmospheric pressure, I employ a second passage leading fluid into the chamber 22. Thus a plug 66 is threaded into the upper wall of the chamber 22 but at the opposite side of the chamber from the vent. This plug is provided with a vertical bore 68 and a horizontal bore 70 communicating with the vertical bore. At the discharge end of the passage I have provided a valve 72 which is yieldingly held in engagement with its seat by spring 74. Plug 66 projects upwardly into chamber 76 and is submerged in the fluid contained therein. For convenience I have preferably formed the chambers 64 and 76 in the same casting separated by partition 78, and, as a further simplification, I may combine the chambers 64 associated with adjacent valves into a single chamber. Thus as illustrated in Figure 2, the chamber 76 is of a length to serve the valves of three adjoining cylinders. Chamber 64 may be similarly designed. The chamber 76 may be supplied with fluid under gravity head from the fluid contained in a suitable elevated tank or pump pressure. I prefer to make use of the latter and for this purpose I have indicated at 80 a supply pipe leading into the chamber and conducting fluid under pressure from pump 82. While various fluids may be employed in the valve operating mechanism, for convenience and simplicity I prefer to use the engine oil contained in the crankcase 8 and am thereby enabled to use the conventional pump 82 which supplies oil under pressure to the bearings for supplying oil to the chamber 76. I have also provided a pressure relief valve 84 in the partition 78, the fluid passing through this valve discharging into the chamber 64 which is preferably at atmospheric pressure and may if desired be provided with a suitable pipe 86 for the return of oil to the crankcase. The pressure relief valve prevents the building up of sufficiently high pressures in the pressure chamber to effect actuation of the valves independently of the tappets. In practice, I have found 10 to 30 pounds pressure to be sufficient to secure the desired scavenging flow.

The operation of the device is as follows. Let it be assumed that chambers 22, 64, and 76 are filled with oil. In the operation of the engine, pump 82 continues to feed oil to the chamber 76 building up the pressure to a point where discharge takes place through bypass 84, the surplus oil returning to the crankcase through the conduit 86. The valve tappet 20 on its upward or working stroke effects opening of the valve 14 in the manner previously described. During the non-operating portions of the cycle of movement of the valve operating mechanism, spring 34 causes plunger 24 to follow the tappet in its movement and the pressure in chamber 22 being relieved, oil under pressure enters the chamber 22 from chamber 76 through passages 70, 68, and past valve 72. This influx of fresh oil causes oil and such air as may have collected in the high point of the chamber 22 to pass outwardly through vent 44 in the manner previously described, the valve 56 at this time being forced downwardly into engagement with seat 52 by the action of spring 58. The passage of oil into the chamber 64 causes further flow of excess oil through stand-pipe 86 back to the crankcase. Thus between operating strokes of the valve mechanism the supply of oil has been renewed and such air as may have entered the chamber 22 through the various joints and seals has been removed by the scavenging action of the entering oil stream. Upon the subsequent operating stroke of the tappet, valve 72 is closed and valve 56 is forced into engagement with seat 54 sealing the vent so that substantially the full force of the tappet is transmitted through the oil to the valve operating plunger 36 forcing the latter downwardly to open the valve.

It will be noted that at all time the passages 68—70 and the vent 48 are sealed by liquid. In the case of passages 68—70 this liquid seal besides preventing the entrance of air, also possesses the advantage that should the chamber 22 become empty of oil during periods of idleness of the engine there is sufficient oil in the chamber 76 to replenish the supply at once and permit operation of the engine.

The design is also such that any oil leaking past the valve or tappet plungers is received in chamber 90 and eventually drains back into the crankcase through the passages indicated at 92 surrounding the valve tappets. It will be noted also that the baffle 42 prevents oil from passing down the valve stem into the combustion chamber there being sufficient oil vapor in the chamber 90 to effectively lubricate the valves and valve guides.

The device as so far described presents the possibility that should the valve itself stick in open position, spring 40 will hold the plunger 36 depressed and upon the return stroke of the tappet additional oil will be drawn into the chamber 22 increasing the oil supply so that upon the next operating stroke of the valve tappet the valve will be forced further off its seat and, as this action is repeated, the valve would eventually encounter the piston resulting in damage to the parts. To avoid this contingency I have provided a vent 96 which is so located that it is uncovered by plunger 36 when the latter is depressed beyond its normal position as a result of sticking of the valve stem, and oil from chamber 22 is discharged into chamber 90 and returned to the crankcase and no further downward movement of the valve and plunger is possible.

By reference to Fig. 4 it will be noted that the tappet plunger 24 is larger in cross section than the valve plunger 36, and will consequently displace a greater volume of fluid for a given increment of movement. Consequently, while the tappet plunger moves through a distance which is merely equal to the amount of lift of the cam, the valve plunger moves through a considerably greater distance. This, as previously pointed out, permits the use of cams of low lift, cams of such design possessing the desirable quality of being quieter in action.

In Figure 6 I have illustrated the application of my device to an L-head engine. In this Figure 21' indicates the cam shaft, 14' a portion of one of the valves provided with the usual spring 100 to hold it upon its seat. 36' indicates a plunger engaging the valve at its outer end and projecting into chamber 22' at its inner end. Into this chamber also projects a tappet 20', the lower end of which is held in engagement with a cam upon cam shaft 21' by means of suitable spring 102. The tappet is hollow and is provided with an internal shoulder 104 upon which seats washer 106. Between the washer and the plunger 36' is a floating disk 108. Chamber 22' is provided with a vent 44' of the same type as that described in connection with the preferred form. This vent is submerged in oil contained in a chamber 64', this chamber being provided with a discharge pipe 86' for returning oil to the crankcase. An apertured fitting 66' provided with valve 72' serves for the passage of oil from pressure chamber 76' into chamber 22' as in the preceeding form. Chamber 76' is supplied with oil under pressure from any suitable source through conduit 80', bypass 106 provided with pressure relief valve 84' connecting chambers 76' and 64' as in the preceding form. The operation of the device is substantially the same as in the preceding form. Upon upward movement of the tappet 20', plunger 36' and valve 14' are forced upwardly by fluid pressure in the chamber 22'. At the same time valve 72' and vent 44' are closed. During the non-operating portions of the cycle of movement of the valve operating mechanism, oil enters chamber 22' from chamber 76' and oil and air pass outwardly through the vent 44' into chamber 64' and excess oil is returned to the crankcase through passage 86'. Pressure bypass 106 operates in the usual manner to prevent the building up of excessive pressures in the chamber 76'

The purpose of washer 106 and disk 108 is to provide mechanical operation of the valves should chamber 22' accidentally become empty of oil. In normal operation disk 108 and plunger 36' do not come into working contact for with tappet 20' of larger area than plunger 36' the distance between the two increases as the tappet rides up on the lobe of the cam. With chamber 22' empty, disk 108 resting on washer 106, engages the end of plunger 36' and opens the valve. While the amount of opening is slight, it is sufficient to permit operation of the engine until the oil supply is renewed.

In this, as well as the preferred form, the employment of a tappet plunger of greater area than the valve plunger permits the use of cams of low lift and consequent quietness.

I claim:

1. In an engine, the combination of valve operating mechanism, valve mechanism, a chamber into which said valve mechanism and valve operating mechanism project, fluid in said chamber for effecting operation of the valve upon actuation of the valve operating mechanism, a vent arranged at the highest point in said chamber into which is fitted a valve for permitting escape of air, and means for feeding oil into said chamber under pressure during non-operating portions of the cycle of movement of the valve operating mechanism.

2. In an engine, the combination of valve operating mechanism, and valve mechanism, a body of fluid interposed between said mechanisms for transmitting movement from the former to the latter, and a vent for said body of fluid to permit the escape of air, said vent comprising a valve having a plurality of seats with one of which said valve has non-sealing engagement when the body of fluid is not transmitting movement from the valve operating mechanism to the valve and with the other of which said valve has sealing engagement when the body of fluid is transmitting movement from the valve operating mechanism to the valve.

3. In combination with a puppet valve, valve closing means, a lift pump, a casing enclosing a column of hydraulic fluid between said pump and said valve whereby the operation of said pump is communicated to said valve, means replenishing fluid in said column between the valve actuation of said pump, and bleed valve opening from a point of air accumulation in said casing, a timed means closing said air bleed valve during puppet valve actuation periods.

4. In combination with a puppet valve, valve closing means, valve actuating means including a closed fluid casing to the interior of which the stem of said valve is exposed, timed mechanism imposing impulses on fluid in said casing whereby said valve is actuated, non-return means supplying hydraulic fluid to said casing, a relief valve opening from a region of air accumulation in said casing, and timed means closing said relief valve during periods of puppet valve actuation.

5. In an engine, the combination of valve operating mechanism, valve mechanism, a chamber into which portions of said mechanisms project, a body of fluid in the chamber for effecting operation of the valve mechanism upon actuation of the valve operating mechanism, said chamber being provided with a fluid inlet and a fluid outlet, valves for said inlet and outlet, and means for causing a flow of fluid under pressure from said inlet to said outlet to replenish the fluid supply and remove air therefrom during non-operating portions of the cycle of the valve operating mechanism, said valves being closed upon the active stroke of the valve operating mechanism by the pressure developed in the body of fluid.

6. In an engine, the combination of valve operating mechanism, valve mechanism, a chamber into which portions of said mechanisms project, a body of fluid in the chamber for effecting operation of the valve mechanism upon actuation of the valve operating mechanism, said chamber being provided with a fluid inlet and a fluid outlet, valves for said inlet and outlet, and means for causing a flow of fluid under pressure from said inlet to said outlet to replenish the fluid supply and remove air therefrom during non-operating portions of the cycle of the valve operating mechanism, said valves being closed upon the active stroke of the valve operating mechanism by the pressure developed in the body of fluid, a body of fluid under pressure submerging said inlet, and a body of fluid submerging said outlet.

7. In hydraulic operating mechanism the combination of operated mechanism, a hydraulic chamber associated with said operated mechanism so that the latter is operated by displacement of fluid in said chamber, timed mechanism embodying impulses on fluid in said chamber whereby said operated mechanism is operated, non-return means supplying hydraulic fluid to said chamber, a relief valve opening from a region of air accumulation in said chamber, and timed means closing said relief valve during non-operating portions of the cycle of movement of said mechanism.

8. In hydraulic operating mechanism the combination of operating mechanism, operated mechanism, a hydraulic chamber between said mechanisms so that said operating mechanism actuating said operated mechanism by displacement of fluid in the chamber, a fluid inlet for said chamber, a fluid outlet for said chamber communicating therewith at a high point in the chamber, valves for said inlet and outlet adapted to be closed during the operating portions of the cycle of movement of said mechanism and means for causing a flow of fluid under pressure through the chamber from said inlet to said outlet to replenish the fluid supply and remove air therefrom during non-operating portions of the cycle of movement.

9. In hydraulic operating mechanism the combination of operating mechanism, operated mechanism, a hydraulic chamber between said mechanism so that said operating mechanism actuating said operated mechanism by displacement of fluid in the chamber, a fluid inlet for said chamber, a fluid outlet for said chamber communicating therewith at a high point in the chamber, valves for said inlet and outlet adapted to be closed during the operating portions of the cycle of movement of said mechanism and means for causing a flow of fluid under pressure through the chamber from said inlet to said outlet to replenish the fluid supply and remove air therefrom during non-operating portions of the cycle of movement, a fluid reservoir overlying one of said valves and sealing it against admission of air.

10. In hydraulic operating mechanism the combination of operating mechanism, operated mechanism, a hydraulic chamber between said mechanisms so that said operating mechanism actuates said operated mechanisms by displacement of fluid in the chamber, means for replenishing fluid in said chamber during non-operating portions of the cycle of movement of said mechanism, a bleed valve opening from a point of air accumulation in said casing, and timed means closing said air bleed valve during operating portions of the cycle of movement of said mechanism.

11. In an engine the combination of a cylinder, a piston in the cylinder, a removable head for the cylinder, a poppet valve mounted in said head, hydraulic operating means for said poppet valve comprising a fitting mounted on said head having a hydraulic chamber therein lying wholly above said head and in operative relation to said valve to open the latter by displacement of fluid in the chamber, an operating plunger arranged to displace fluid in said chamber to open the valve, and means for intermittently actuating the operating plunger.

12. In an engine the combination of a cylinder, a piston in the cylinder, a removable head for the cylinder, a poppet valve mounted in said head, hydraulic operating means for said poppet valve comprising a fitting mounted on said head having a hydraulic chamber therein lying wholly above said head and in operative relation to said valve to open the latter by displacement of fluid in the chamber, an operating plunger arranged to displace fluid in said chamber to open the valve, and means for intermittently actuating the operating plunger, said chamber being provided with a port communicating with the upper portion thereof and a fitting secured over said port and forming with said chamber a reservoir overlying said port.

13. In an engine the combination of a bank of cylinders, pistons in the cylinders, a removable head for the cylinders, poppet valves for said cylinders mounted in said head, hydraulic operating means for said poppet valves comprising a fitting mounted on said head and provided with a plurality of hydraulic chambers therein, one for each of said valves and in operative relation therewith, an operating plunger in each of said hydraulic chambers for displacing fluid to actuate the corresponding valve, and means for intermittently actuating each of said operating plungers.

14. In an engine, the combination of valve operating mechanism, valve mechanism, a chamber into which said valve mechanism and valve operating mechanism project, fluid in said chamber for effecting operation of the valve upon actuation of the valve operating mechanism, and a vent at the highest point in said chamber for permitting escape of air, and a valve associated with said vent and adapted to close the latter on the actuating stroke of the valve operating mechanism.

15. In an engine having a plurality of valves, operating means for each of said valves, a fluid chamber interposed between each of said mechanisms and its corresponding valve, a common fluid pressure reservoir, passages from said reservoir to said fluid chambers, and check valves in said passages adapted to permit flow of fluid into said fluid chamber on the return stroke of said valve operating mechanism, a vent for each of said chambers, and a low pressure reservoir into which said vents discharge.

GEORGE E. A. HALLETT.